United States Patent [19]
Delaney

[11] Patent Number: 5,918,256
[45] Date of Patent: Jun. 29, 1999

[54] MOTOR VEHICLE EMISSION ANALYSIS SYSTEM

[76] Inventor: William O. Delaney, 37 New Haven, Laguna Niguel, Calif. 92677

[21] Appl. No.: 08/958,181

[22] Filed: Oct. 27, 1997

[51] Int. Cl.[6] .................................................. G01M 15/00
[52] U.S. Cl. ............................................ 73/23.31; 60/276
[58] Field of Search ............................... 73/23.31, 23.32, 73/118.1, 116, 117.2, 117.3, 864.15, 864.21, 864.35, 864.81; 60/276, 277

[56] References Cited

U.S. PATENT DOCUMENTS

| | | | |
|---|---|---|---|
| 3,603,155 | 9/1971 | Morris et al. | 73/23.31 |
| 3,822,581 | 7/1974 | Hauck et al. | 73/23.31 |
| 3,973,848 | 8/1976 | Jowett et al. | 73/23.31 |
| 4,160,373 | 7/1979 | Fastaia et al. | 73/23.31 |
| 4,372,155 | 2/1983 | Butler et al. | 73/23.32 |
| 4,686,846 | 8/1987 | Aramaki | 73/23.32 |
| 5,526,675 | 6/1996 | Ratton | 73/118.1 |
| 5,644,070 | 7/1997 | Gibboney et al. | 73/23.32 |
| 5,709,082 | 1/1998 | Harris et al. | 73/118.1 |

*Primary Examiner*—George Dombroske
*Attorney, Agent, or Firm*—Harold L. Jackson

[57] ABSTRACT

A vehicle emission analysis interface system for supplying a sample of a test vehicle's exhaust gases to the inlet of an analyzer for providing a quantitative measurement of selected pollutants includes an exhaust sample inlet port for receiving a sample of the exhaust gases. A high pressure inlet port is adapted to be connected to a high pressure source at the test facility. A chiller for lowering the temperature of incoming gas sample stream has an inlet connected to the sample inlet port and an outlet. The system further includes a zero air generator having an inlet and an outlet for supplying purified air for analyzer calibration purposes. A reverse purge valve is arranged to selectively connect the high pressure inlet port to the zero air generator inlet and the chiller outlet in series with the analyzer inlet or to connect the high pressure inlet port to the chiller outlet to purge the chiller and components which feed the exhaust gas sample to the chiller of pollutants in the gas sample of the last vehicle tested. Valving is also provided to direct air from the zero air generator to a fuel cap adaptor with the flow rate being measured to check the integrity of the fuel cap with respect to the leakage of pollutant fumes.

18 Claims, 3 Drawing Sheets

MOTOR VEHICLE EMISSION ANALYSIS SYSTEM

FIELD OF THE INVENTION

The present invention relates to a system for evaluating the principal air contaminants in the exhaust gas emissions of internal combustion engines installed in motor vehicles and more particularly to a system which interfaces between an exhaust probe inserted in a vehicle's exhaust pipe and an analyzer.

DESCRIPTION OF THE PRIOR ART

It is well known that the exhaust gases from motor vehicles are a prime cause of air pollution. Over the years various states in the United States, as well as foreign countries, have required that all vehicle engines be tested periodically to determine the quantitative presence of harmful contaminants such as unburned hydrocarbons (HC), carbon monoxide (CO), carbon dioxide ($CO_2$), nitric oxide (NO), and oxygen ($O_2$) in the exhaust gas stream. Standards are set at the state or federal level and vehicles in which the exhaust gases exceed the standards are required to be repaired to correct the engine malfunction. The vehicles are conventionally tested in vehicle test stations which accommodate large numbers of vehicles with a plurality of test lanes. One vehicle after another is tested in each lane.

Recently as a result of our increasing environmental concerns, the U.S. Environmental Protective Agency ("EPA"), under the mandate of the 1990 Clean Air Standards Act, has required 38 major metropolitan areas, in the United States, to reduce pollutants in motor vehicle exhaust emission by implementing inspection maintenance ("IM") programs. This requires that a vehicle's exhaust gases be sampled and analyzed under a simulated loaded condition, i.e., run on a dynamometer to simulate acceleration and road load forces. California has been at the leading edge in developing a program to comply with the EPA mandate.

Through its Bureau of Automotive Repairs ("BAR"), California developed testing and repair specifications which met the EPA requirements and many other states and foreign countries have followed suit in adopting the BAR program.

The BAR program has greatly expanded the need for emission testing and repair facilities. This, in turn, has created a need for an accurate, reasonably priced, instrumentation system, capable of handling and analyzing vehicle exhaust gases on a mass through put basis. Space requirements are also an important factor since existing repair shops, with their limited garage areas, will bear the bunt of the testing and analysis work.

Analyzers capable of providing quantitative measurements of exhaust gas pollutants have been available for some time. However, to provide an accurate measurement, the exhaust gas steam entering the analyzer must be preconditioned to remove water vapor and solid particles. In addition, the analyzers must be periodically calibrated using calibration gases with predetermined levels of the several pollutants.

A sample of the gas to be analyzed is obtained by inserting an exhaust probe into the vehicle's exhaust pipe. A flexible hose is generally connected between the probe and the analyzer housing. A pump is utilized to draw the sample of exhaust gases from the probe to the analyzer instrumentation. It is important that the sample being analyzed not be contaminated with pollutants left over in the probe, the connecting hose and the major conditioning elements (upstream from the analyzer) from a previous vehicle's exhaust. To obviate this problem, prior art interface systems have simply continued to operate the exhaust gas pump during the interval between the withdrawal of the probe from the exhaust pipe of the last vehicle tested to the insertion of the probe into the exhaust pipe of the next vehicle to be tested. While this technique may aid in reducing cross contamination between vehicles, it suffers the disadvantage of impermeating the probe and hose with ambient air from the test facility which in all probability will include its own set of pollutants.

To properly condition the exhaust gas sample for input into the analyzer, it is necessary to remove the water vapor therefrom. Prior art interface systems have generally utilized cryogenic gases, via suitable heat exchangers, to lower the temperature and drop the dew point of the incoming exhaust gas stream to thereby dehumidify the gas. While this technique is quite satisfactory, it requires containers of cryogenic gas with their attendant expense and space requirements.

The analyzer must be periodically calibrated which requires the availability of substantially pure air (as well as calibration gases containing preset levels of the several pollutants which are the subject of the testing process). Typically the pure air is supplied from one or more high pressure tanks to the analyzer to provide a true zero reference point. The use of such tanks not only requires considerable space, but adds to the overall testing costs.

In addition to checking for excess exhaust gas pollutants, it is advisable and perhaps necessary (depending upon the applicable laws) to check the integrity of the fuel tank closure or cap since a faulty cap can allow vaporized unburned hydrocarbons to escape into the atmosphere. Typical exhaust gas analysis instrumentation does not provide any means to accomplish this task.

There is a need for a vehicle emission analysis interface system which overcomes the above shortcomings.

SUMMARY OF THE INVENTION

A vehicle emission test interface system, in accordance with the present invention, includes an exhaust inlet port for connection to an exhaust gas probe through a hose. The system further includes a high pressure air inlet port adapted to be connected to a high pressure air source. A chiller, preferably of the electronic type, for reducing the temperature of the incoming exhaust gas sample, has an inlet and an outlet with the inlet being connected to the exhaust gas inlet port. A zero air generator, with an inlet and an outlet, provides relatively pure air under a predetermined pressure for calibration purposes. A reversing purge valve arrangement is connected in series relationship with the high pressure inlet port, the zero air generator inlet port, the chiller outlet and the inlet of an analyzer. The purge valve is arranged to selectively connect the high pressure air inlet port to the zero air generator inlet and at the same time connect the chiller outlet in series with the analyzer inlet port or to connect the high pressure inlet port to the chiller outlet. The former valve setting conducts a sample of the vehicle exhaust gases to the analyzer while the latter valve setting provides a reverse flow of air through the chiller, the exhaust probe hose and the exhaust probe to flush out any pollutants remaining in such as components after the analysis has been made. A pressure regulator provides a low pressure in the outlet of the zero air generator.

Preferably the system includes a fuel tank access cap integrity test port which is adapted to be connected to a fuel cap adaptor through a hose or conduit. A fuel cap integrity test valve is connected in series relationship with a low pressure gas source (preferably to the zero air generator outlet), a flow sensor and the fuel cap integrity test port. The flow sensor measures the rate of gas flow through the adaptor with the vehicle fuel cap mounted thereon. Other features of the present invention are set forth in the description of the preferred embodiment.

The construction, operation and features of the present invention may best be understood by reference to the following description taken in conjunction with the accompanying drawings in which like components are given the same reference numerals.

DESCRIPTION OF THE PREFERRED EMBODIMENT

Figure 1:
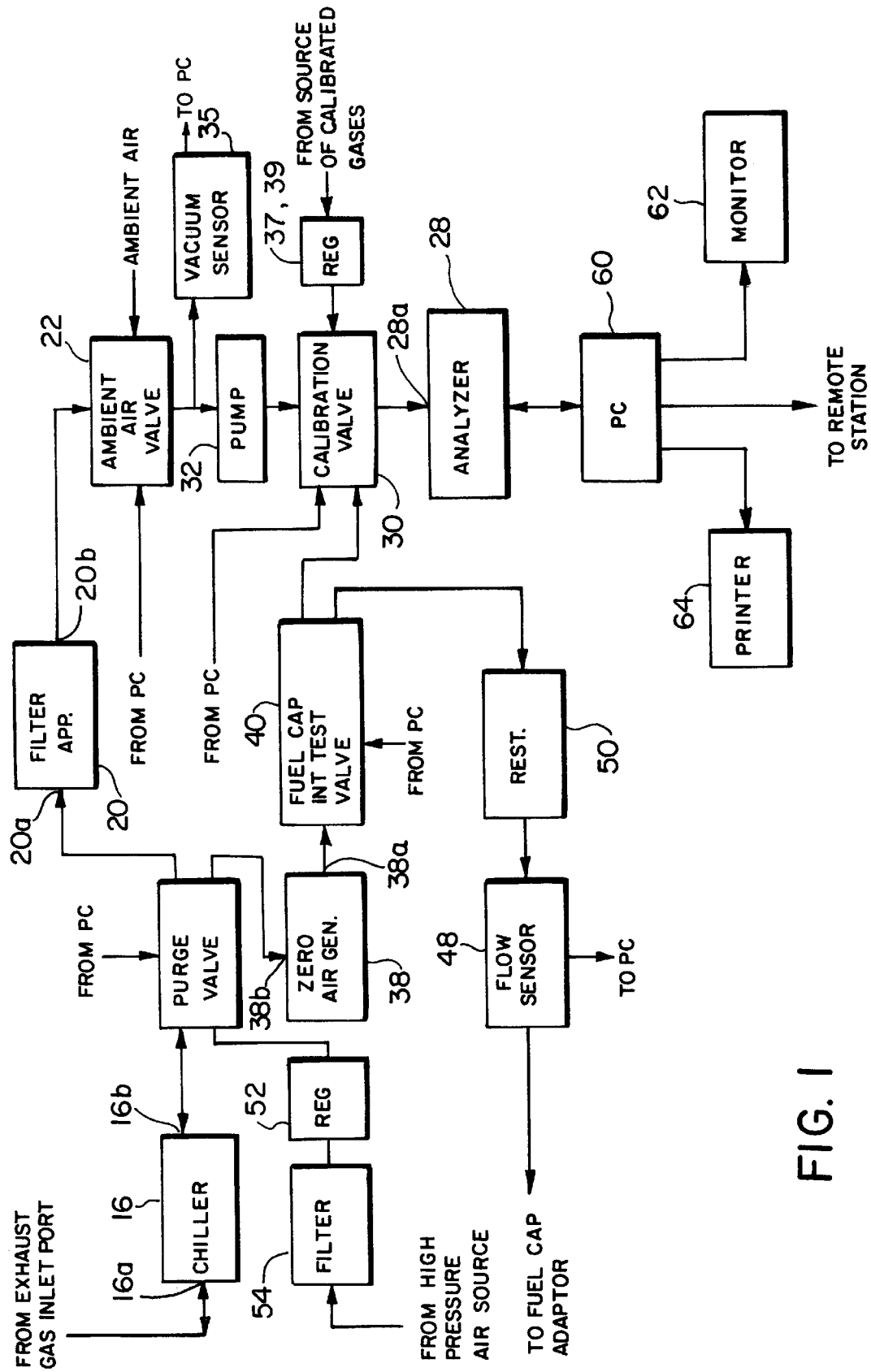
FIG. 1 is a block diagram of a vehicle emission analysis system in accordance with the present invention.
Figure 2:
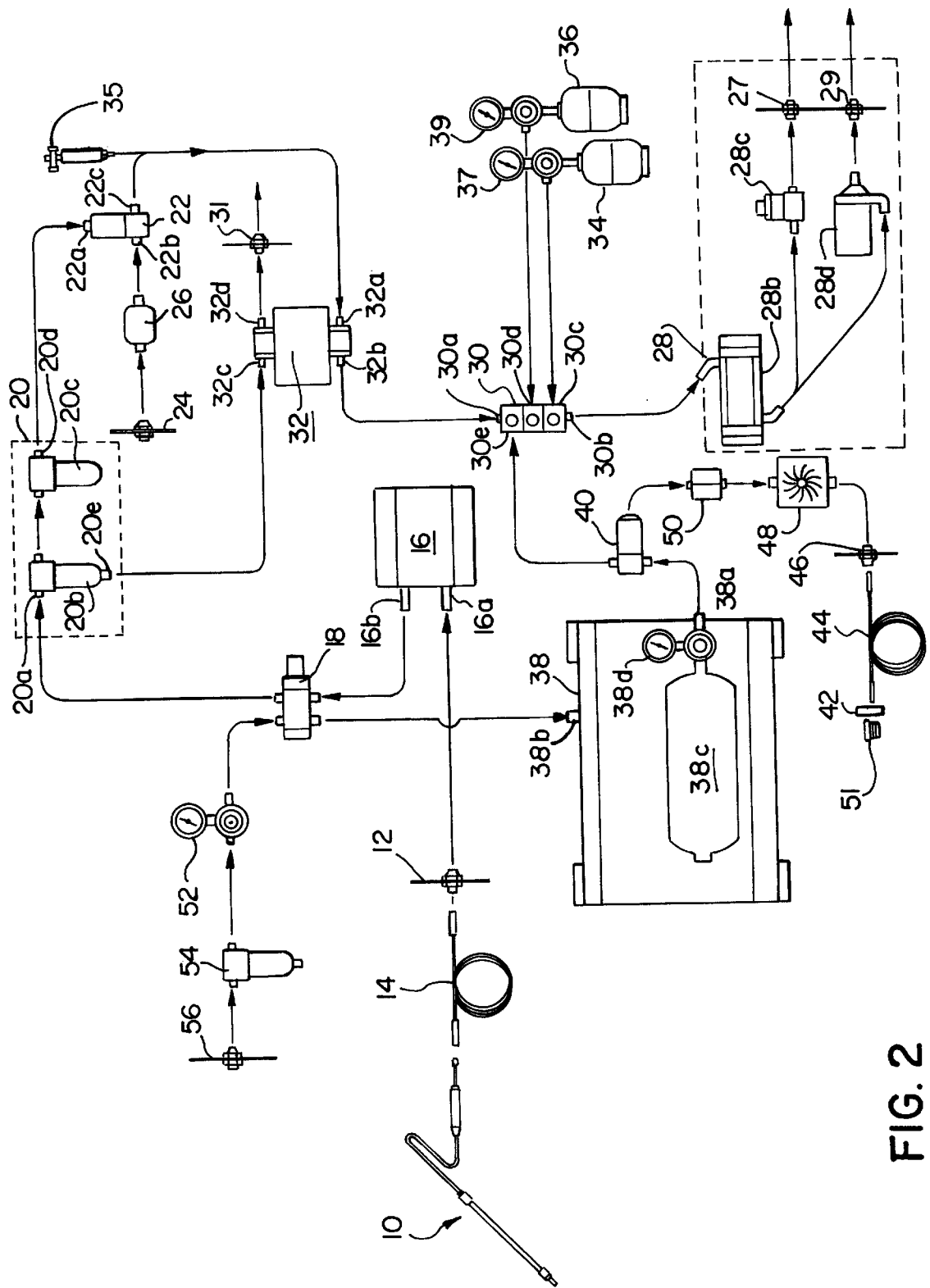
FIG. 2 is a pneumatic flow diagram of the system of FIG. 1 showing the normal flow of a sampled exhaust gas to the analyzer instrumentation.

Referring now to FIGS. 1 and 2 an exhaust gas probe 10, adapted to be inserted into the exhaust pipe, of a vehicle (not shown) being tested, is connected to an exhaust gas inlet port 12 via a flexible hose assembly 14. The port 12, as well as several other inlet and outlet ports to be described, are secured in bulkheads which form part of a housing for the vehicle emission analysis system of the present invention. The entire interface system may conveniently mounted in one or perhaps two drawers of a cabinet.

A chiller 16, for lowering the temperature of the incoming exhaust gas sample and thereby lowering its dew point, has an inlet 16a connected to the port 12. An outlet 16b of the chiller is selectively connected, via a reverse purge solenoid controlled valve 18, to the inlet 20a of a moisture and particulate filter 20. The filter 20 comprises a moisture removal section 20b and a particulate removal section 20c. See FIG. 2. The chiller is of the thermal electric type in which the flow of electricity through dissimilar metals causes heat to flow from one region, such as the heat exchange conduit through which the gas sample is passing, to another region such as the atmosphere, as is well known to those skilled in the art. The chiller drops the temperature of the gas sample stream to about 50° F.

A solenoid operated ambient air valve 22 selectively supplies an exhaust gas sample from the outlet 20d of the filter 20 or ambient air (for calibration purposes) from an ambient air inlet port 24 (and filter 26) to the inlet of 28a of analyzer instrumentation 28 via a solenoid operated three line calibration valve 30 and a pump 32 as will be described in more detail. The ambient air valve includes a gas sample inlet 22a connected to the outlet of the filter 20 and ambient air inlet 22b connected to the filter 26. The pump 32 has a gas 32a inlet (connected to the ambient air valve outlet 22c) and an outlet for the exhaust gas sample stream as well as a water inlet 32c and outlet 32d for removing the condensed moisture from the filter section 20b via an outlet port 31.

The analyzer 28 is formed in three sections, i.e., a bench unit 28b which measures HC, $CO_2$, CO, an $O_2$ sensor 28c and NO sensor 28d. The analyzer output stream is exhausted to atmosphere via outlet ports 27 and 29. A vacuum transducer or sensor 34 is connected in the line between the valve 22 and the gas inlet 32a of the pump 32 for detecting the presence of a leak in the system upstream from the pump with the probe 10 capped off.

The calibration valve 30 includes a gas sample inlet 30a and an outlet 30b which are normally in fluid communication with each other to connect the gas outlet 32b of the pump 32 to the analyzer inlet 28a. This valve is also arranged to selectively route calibration gases from high and low calibration vessels 34 and 36, via gas calibration inlets 30c and 30d, respectively, to the analyzer inlet 28a. The vessels 34 and 36 contain high and low levels of the pollutants or contaminants, respectively. These vessels contain predetermined amounts, in parts/million, of the pollutants to be measured. Pressure regulators 37 and 39 control the pressure (e.g., 1–3 psia) of the calibration gases from the vessels 34 and 36, respectively.

The valve 30 is also arranged to selectively supply substantially pure air from the outlet 38a of a zero air generator 38 (for calibration purposes) via a fuel cap integrity test solenoid operated valve 40 and a purified air inlet 30e. The outlet from the zero air generator 38 is also selectively routed by the valve 40 to a fuel tank closure cap adaptor 42 via a hose or conduit 44, fuel cap integrity test port 46, a flow sensor 48 and a precision orifice or restrictor 50. The orifice 50 provides an appropriate flow rate, say 60 cc/min., to the adapter. A fuel cap 51 of the vehicle being tested is secured to the adaptor 42 during the integrity test. The flow sensor is preferably arranged to provide a reading of about 20–100 cc/min.

The inlet 38b of the zero air generator receives air under pressure, via the reverse purge valve 18, a pressure regulator 52, a filter 54, a high pressure air inlet port 56 and a high pressure air source, e.g., 110 psia, (not shown) supplied, for example, by the testing facility. The zero air generator includes an internal scrubber, such as an ionizer and one or more filters (not shown) for removing substantially all impurities from the incoming air and a reserve cylinder 38a for accumulating and maintaining the filtered air at a suitable pressure level. A pressure regulator 38d is also provided adjacent to and in series with the outlet of the zero air generator to supply purified air at a low pressure, e.g., 1–3 psia, from outlet 38a. The zero air generator with its pressure regulator serves as a low pressure air (or gas) source for the fuel cap integrity test procedure. It should be noted that the pressure regulators 38d, 37 and 39 are preferably set to provide a maximum output flow rate of about 2.5 liters/min. This rate can, of course, vary depending upon the specific components utilized in the system.

Figure 3:
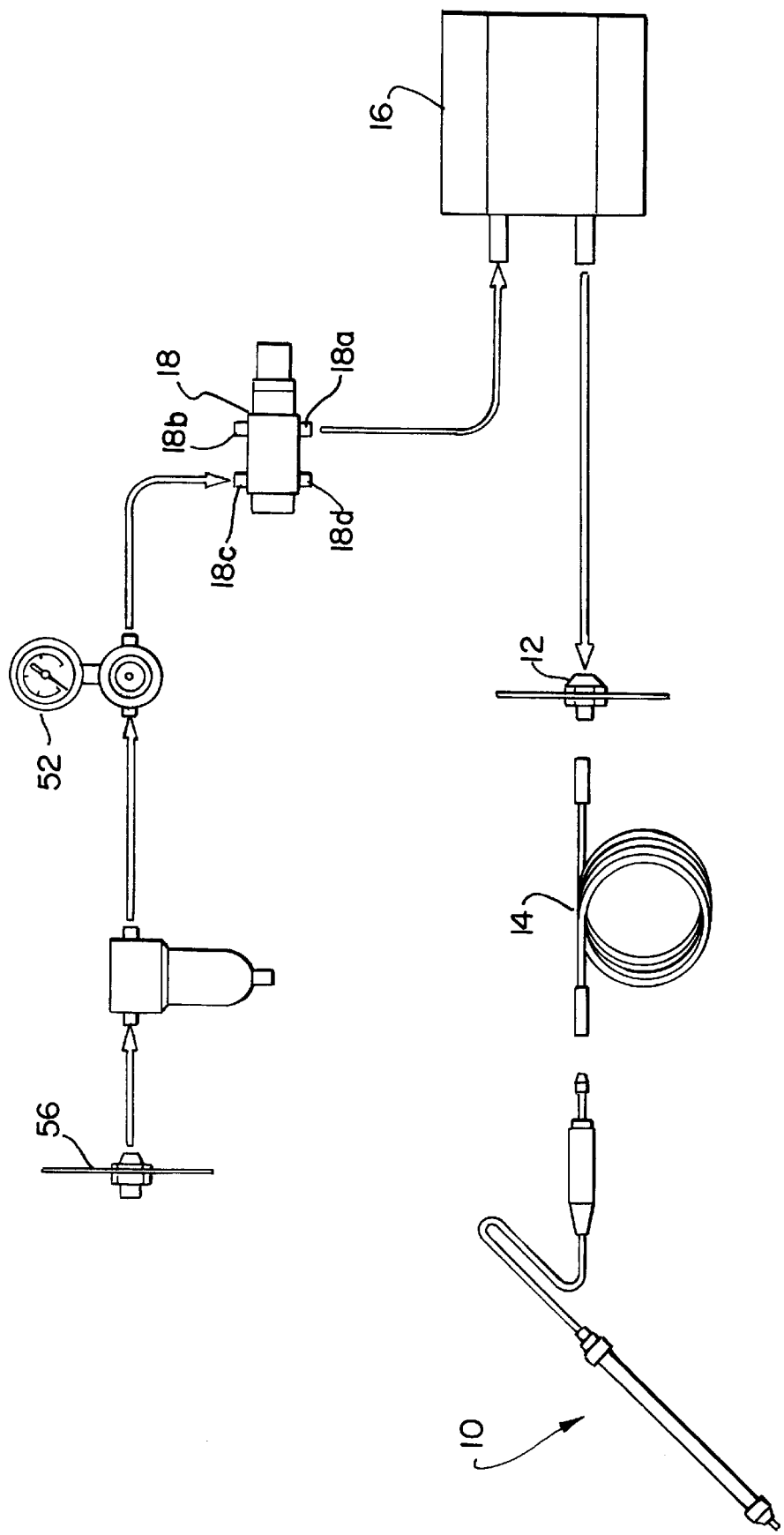
FIG. 3 is a pneumatic flow diagram of a portion of the system of FIG. 1 showing the flow of air in the purge condition.

The reverse purge valve 18, in its normal mode of operation, channels high pressure air from the port 56 to the inlet 38b of the zero air generator and the exhaust gas sample stream from the outlet 16b of the chiller to the inlet 20a of the filter apparatus 20. In its purge mode, the valve 18 redirects air from the high pressure inlet port 56 through the chiller (outlet to inlet), the exhaust gas inlet port, the hose assembly 14, and the exhaust probe 10 as is illustrated in FIG. 3. The reverse purge valve includes a gas sample inlet 18a which is normally connected to the chiller outlet 16b, a gas sample outlet 18b, a high pressure inlet connected to the pressure regulator 52, and a high pressure outlet which is normally connected to the inlet of the zero air generator as is illustrated in FIG. 2.

A computer 60, such as a conventional PC, controls the operation of the various solenoid operated valves as is illustrated in FIG. 1. The PC receives the test data from the analyzer representing the quantitative measurements of the several pollutants from the test vehicle's exhaust gas stream as well as the fuel cap integrity test flow rate. The data will normally be supplied to 1) a monitor 62 for review by the operator, 2) a printer 64 for providing a printed record of the test results, and 3) to a remote station, such as a governmental agency, for entry into a permanent database.

By way of example only, the following off the shelf components may be used in the system:

| Component | Manufacturer |
|---|---|
| Analyzer Section 28b | Sensors Corp. |
| Analyzer Section 28c | Sensors Corp. |
| Analyzer Section 28d | Sensors Corp. |
| Solenoid Valve 18 | Miller Valve |
| Solenoid Valve 30 | Honeywell |
| Solenoid Valves 22,40 | Spartan |

To prepare the system for operation, a high pressure source of air, e.g., compressed air, at the testing facility, is connected to the port 56. The analyzer is then calibrated, if necessary, by sequentially routing the calibration gases and/or ambient air and purified air to the analyzer sections via valves 30, 22 and 40. The hose 14 and exhaust probe may then be connected to port 12. The probe and hose may be checked for leaks by capping the probe 10, operating pump 32 and checking the degree of vacuum measured by the transducer 35.

The exhaust probe may then be inserted into the exhaust pipe of the vehicle to be tested and a sample of the vehicle exhaust gases routed to the analyzer by operating the valves 18, 22 and 30 in their normal mode. The measured values will be compared with prescribed permissible values in the computer. Once the pollutants have been measured, the vehicle's gas fuel cap may be secured to the adaptor 46 with the hose 44 connecting the adaptor to the port 46. The solenoid valve 40 may then be actuated to divert the output air from the zero air generator through the restrictor 50, the flow sensor and the port 42. The measured flow rate will be compared with the permissible value, e.g., 60 cc/min., in the computer. The exhaust probe may be removed from the vehicle's exhaust pipe and readied for use with the next vehicle by operating the purge reverse valve 18 to direct the high pressure air stream from the port 56 through the chiller, hose 14 and probe 10 in a direction opposite the direction of the exhaust sample stream.

Various modifications of the emission analysis system described above will become apparent to those skilled in the art without involving any departure from the spirit and scope of the invention as defined in the appended claims.

What is claimed is:

1. In a vehicle emission analysis interface system for supplying a sample of a test vehicle's engine exhaust gases to an inlet of an analyzer for providing a quantitative measurement of selected pollutants, the combination comprising:

an exhaust gas sample inlet port adapted to be connected to an exhaust gas probe through a hose for receiving a sample of the vehicle's exhaust gases;

a high pressure air inlet port adapted to be connected to a high pressure air source;

a chiller having an inlet and an outlet for lowering the temperature of the exhaust gases passing therethrough, the chiller inlet being connected to the exhaust gas sample inlet port;

a zero air generator having an inlet and an outlet for providing substantially purified air under a predetermined pressure in the outlet thereof; and a reverse purge valve connected in series relationship with the high pressure inlet port, the zero air generator inlet, the chiller outlet and the analyzer inlet, the purge valve being arranged to selectively connect the high pressure inlet port to the zero air generator inlet and the chiller outlet in series with the analyzer inlet or to connect the high pressure inlet port to the chiller outlet.

2. The invention of claim 1 further including an ambient air inlet port and an ambient air valve connected in series relationship with the analyzer inlet, the chiller outlet and the ambient air inlet port for selectively directing the exhaust gas sample from the chiller outlet to the analyzer for analysis of the same or directing ambient air to the analyzer for calibration purposes.

3. The invention of claim 1 wherein the test vehicle includes a fuel cap for providing access to the vehicles fuel tank and further including:

a fuel cap integrity test port adapted to be connected to a fuel cap adaptor through a conduit;

a flow sensor connected to the fuel cap integrity test port for measuring fluid flow through the test port;

a source of low pressure gas; and a fuel cap integrity test valve connected in series relationship with the low pressure gas source, the flow sensor and the fuel cap test port for selectively directing air flow from the low pressure air source through the flow sensor, the fuel cap test port, and the conduit to the fuel cap adaptor.

4. The invention of claim 3 wherein the zero air generator includes a pressure regulator for providing a low pressure air stream in the outlet and wherein the fuel cap test valve is connected between the zero air generator outlet and the flow sensor.

5. The invention of claim 1 further including a pneumatic pump connected in series relationship between the gas sample inlet port and the analyzer inlet.

6. The invention of claim 1 further including a condensed moisture removing filter having an inlet and an outlet, the moisture removing filter being connected in series relationship between the chiller outlet and the analyzer inlet.

7. The invention of claim 6 further including a calibration valve having a gas sample inlet and an outlet, the outlet being connected to the analyzer inlet, the gas sample inlet being connected in series with the moisture removing filter outlet, the calibration valve further having at least one calibration gas inlet adapted to be connected to a calibration gas source, the calibration valve being arranged to selectively connect the gas sample inlet or the calibration gas inlet to the outlet thereof.

8. The invention of claim 7 further including an ambient air inlet port and an ambient air valve, the ambient air valve having a gas sample inlet, an ambient air inlet and an outlet, the gas sample inlet of the ambient air valve being connected to the moisture removing filter outlet, the ambient air inlet port being connected in series with the ambient air inlet of the ambient air valve, the outlet of the ambient air valve being connected in series with the analyzer inlet, the ambient air valve being arranged to route fluid from the moisture removing filter outlet or ambient air to the analyzer.

9. The invention of claim 8 including a pneumatic pump connected between the gas sample inlet of the calibration valve and the ambient air valve outlet.

10. The invention of claim 1 further including means for measuring the degree of vacuum existing at the exhaust gas sample inlet port.

11. The invention of claim 7 wherein at least one calibration gas inlet comprises two inlets with one inlet being arranged to be connected to a high level pollutant source and the other inlet being arranged to be connected to a low level pollutant source.

12. The invention of claim 11 wherein the calibration valve further includes a purified air inlet and means for selectively connecting the zero air generator outlet to the purified air inlet.

13. In a vehicle emission analysis system for providing an analysis of selected pollutants emanating from an motor vehicle, the combination comprising:

a gas analyzer having an inlet for providing a quantitative measurement of the selected pollutants in a sample gas stream;

an exhaust gas sample inlet port adapted to be connected to an exhaust gas probe through a conduit for receiving a sample of the vehicle's exhaust gases;

a dehumidifier connected in series relationship between the gas sample inlet port and the analyzer inlet;

a fuel cap integrity test port adapted to be connected through a conduit to a fuel cap adaptor, the adaptor being arranged to receive a fuel cap;

a flow sensor connected to the fuel cap integrity test port for measuring the fluid flow therethrough;

a source of low pressure gas; and a fuel cap integrity test valve connected in series relationship with the low pressure gas source, the flow sensor and the fuel cap test port for selectively directing air flow from the low pressure air source through the fuel cap test port.

14. The invention of claim 13 further including:

a zero air generator having an outlet for providing substantially pure air at low pressure;

a source of at least one calibration gas;

a calibration valve having an exhaust gas sample inlet connected in series with the dehumidifier to receive the dehumidified gas sample, at least one calibration gas inlet connected to the calibration gas source, a pure air inlet in series with the outlet of the zero air generator and an outlet connected to the analyzer inlet, the calibration valve being arranged to selectively connect the gas sample inlet, the calibration gas inlet or the pure air inlet to the outlet thereof.

15. The invention of claim 14 wherein the dehumidifier includes a thermal electric chiller and a moisture removing filter, the chiller having an inlet and an outlet, the moisturizing filter being connected to the chiller outlet.

16. The invention of claim 15 wherein the zero air generator has an inlet and further including a high pressure inlet port adapted to be connected to a high pressure air source and a reverse purge valve connected to the exhaust gas sample inlet port, the high pressure air inlet port, the chiller inlet and the zero air generator inlet, the purge valve being arranged to connect the gas sample inlet port to the chiller inlet and the high pressure air inlet port to the zero air generator inlet or to connect the high pressure air inlet port to the chiller outlet.

17. The invention of claim 16 wherein the dehumidifier has an outlet and further including an ambient air inlet port, a pneumatic pump having an inlet and outlet and an ambient air valve having an inlet and an outlet, the outlet of the pneumatic pump being connected to the gas sample inlet of the calibration valve, the ambient air valve being connected to dehumidifier outlet, the ambient air inlet port and the pump inlet, the ambient air valve being arranged to connect the dehumidifier outlet or the ambient air inlet port to the pump inlet.

18. The invention of claim 17 wherein the zero air generator comprises the source of low pressure gas.

\* \* \* \* \*